Nov. 28, 1961 E. STOSSEL 3,010,613
FOAM PRODUCING AND DISPENSING DEVICE
Filed May 3, 1957 5 Sheets-Sheet 1

INVENTOR.
Ernest Stossel
BY Michael S. Striker
Attorney

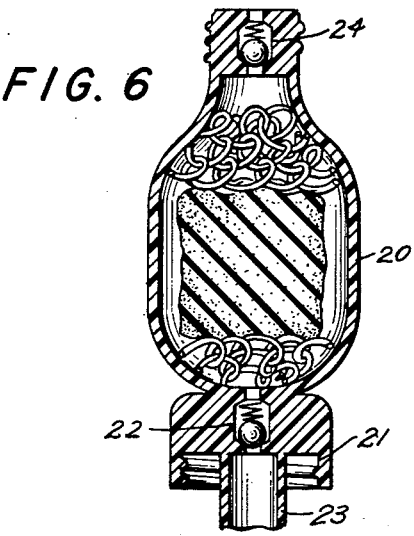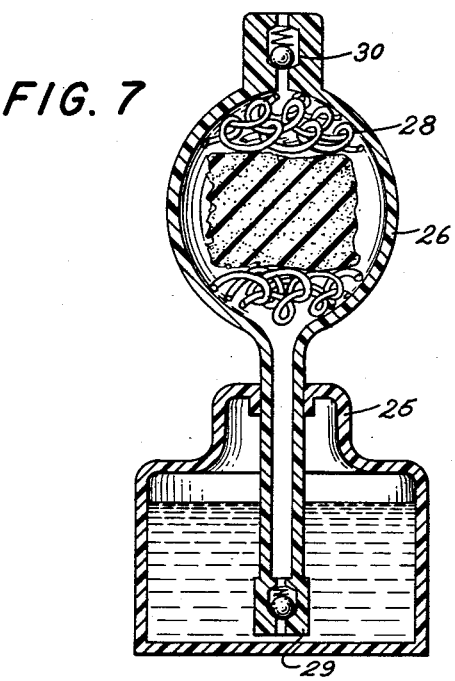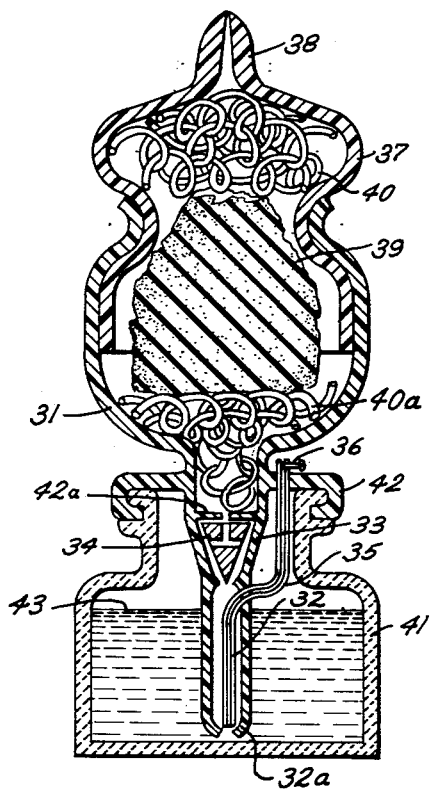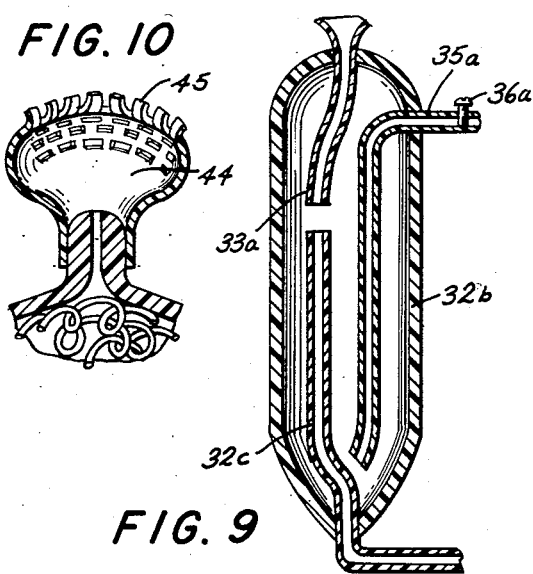

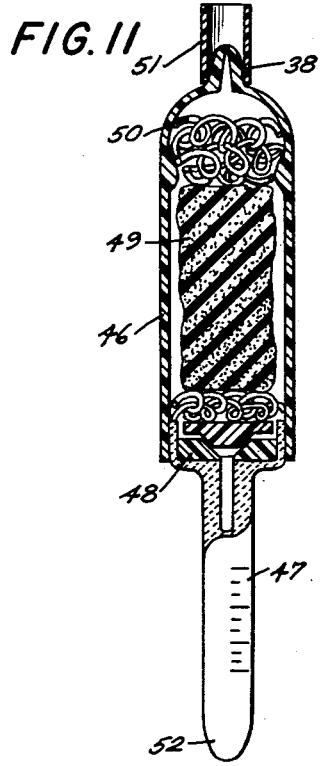
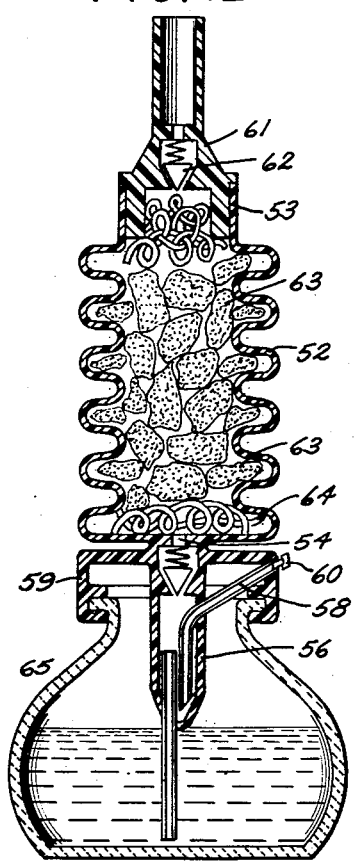
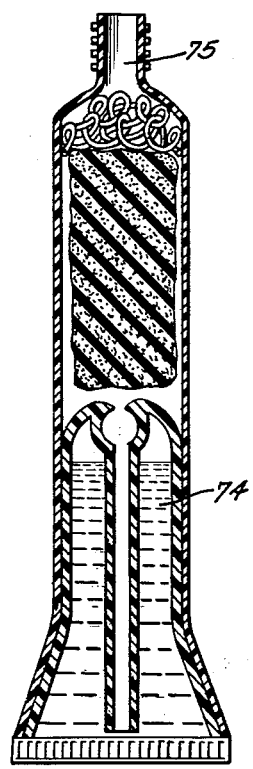
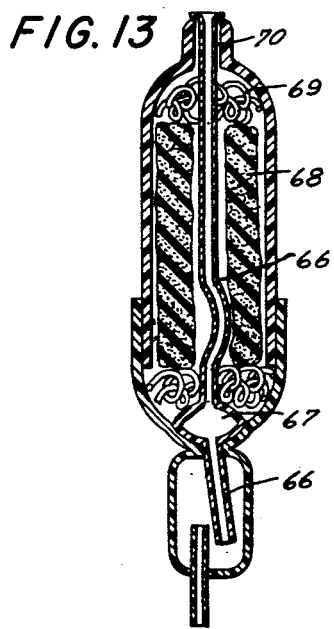
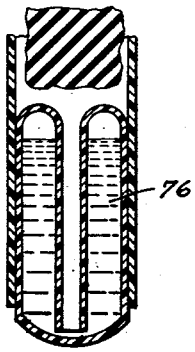
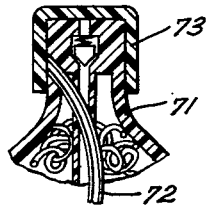

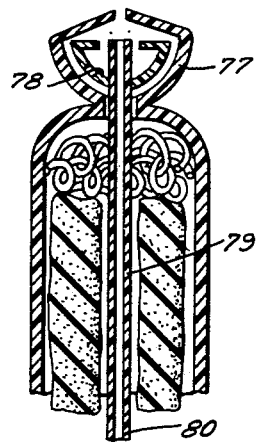
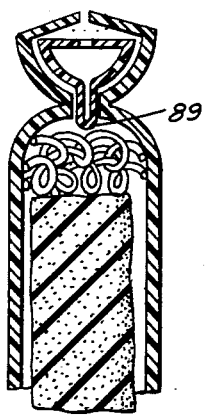
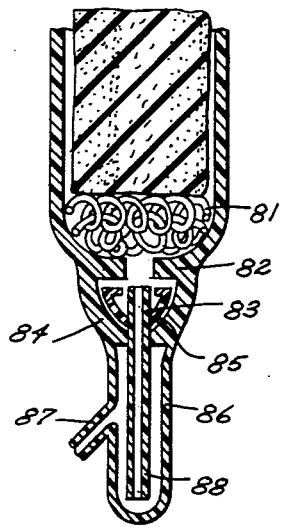
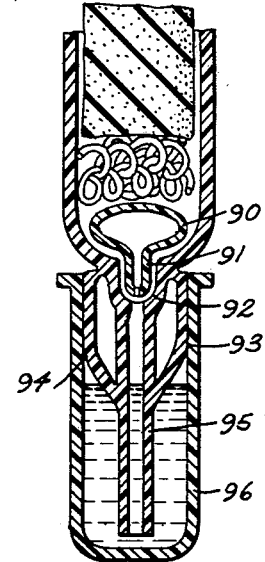

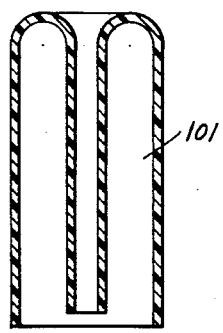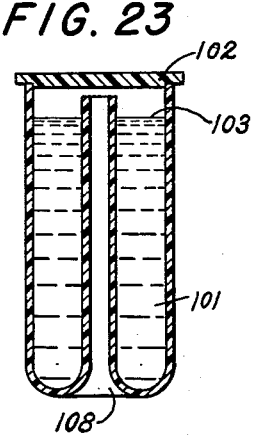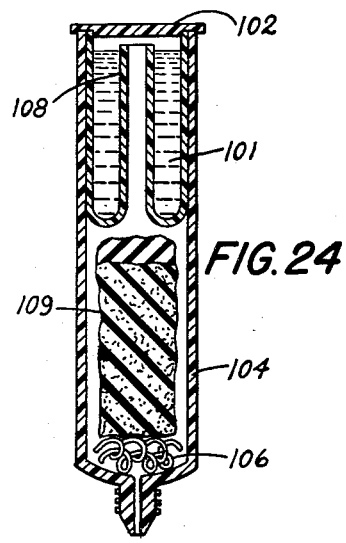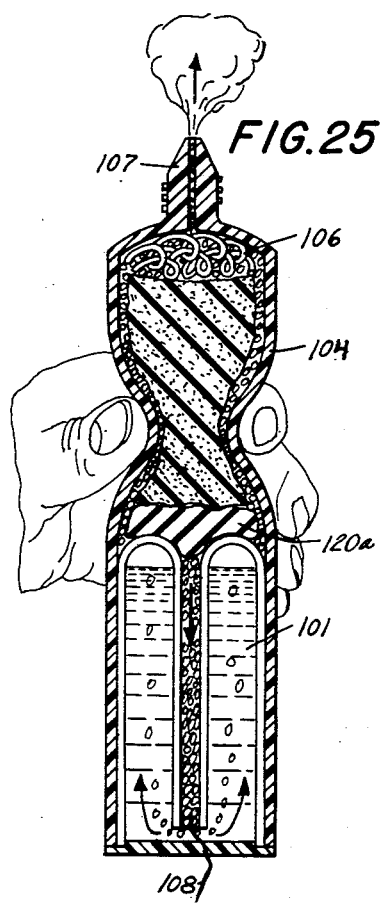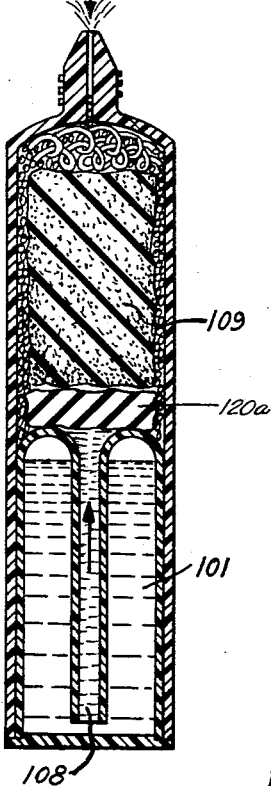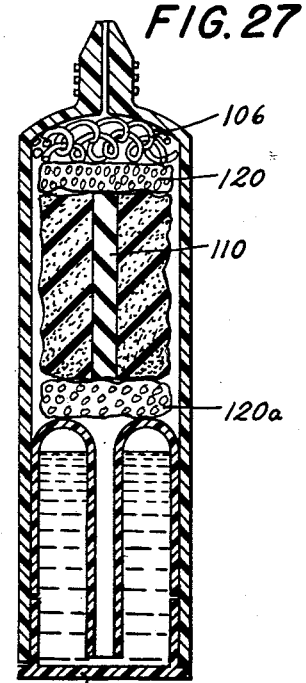

United States Patent Office 3,010,613
Patented Nov. 28, 1961

3,010,613
FOAM PRODUCING AND DISPENSING DEVICE
Ernest Stossel, 203 W. 81st St., New York, N.Y.
Filed May 3, 1957, Ser. No. 656,912
14 Claims. (Cl. 222—190)

The present invention relates to a foam-producing and dispensing device, and more particularly it relates to a device capable of producing and dispensing a uniform foam of controllable characteristics.

The present application is a continuation-in-part of my copending application Serial No. 444,087, now abandoned, filed on July 19, 1954, and entitled "Devices for Producing Foams and Dispensing Same."

Foams may generally be described as dispersions of gases in liquids or as finely divided gas bubbles suspended in a liquid. Thus, in a foam the gas bubbles are separated from each other by a continuous thin film of a liquid. In the form of a foam a liquid can be evenly distributed throughout a relatively large volume whereby the gaseous constituent of the foam may be considered as a diluent for the liquid. Due to the fact that a foam possesses a great volume while containing only a relatively small but evenly distributed quantity of its liquid component, it is possible to uniformly cover a large surface area with a relatively small amount of liquid by applying the liquid in the form of a foam.

Foams find many useful applications, for instance for absorbing gases whose absorption by the liquid constituting the liquid phase of the foam is very slow, to absorb acid mist carried by fumes and thereby rendering the fumes harmless for release into the atmosphere, for taking up the suspended phase of an aerosol which will not be broken down by being passed through or washed with a liquid, and for many other purposes. Furthermore, foams may be used for carrying drugs or other medications to relatively inaccessible parts of body cavities and to ensure prolonged contact between the active constituent of the foam and the walls of the body cavities, for dust control, for fire fighting purposes particularly for extinguishing fires caused by flammable liquids, for evenly distributing or spreading liquids over large areas so as to form a blanket over plants, soil, etc., as a cattle spray and the like.

Various methods for dispersing gases in liquids so as to form a foam have been developed. For instance, foams are produced by introducing gas bubbles into a liquid through relatively fine orifices—the so-called pneumatic method, by moving a perforated plate up and down through a liquid-air interface, by agitation or whipping of a liquid so as to create intimate contact between liquid and gas, or by forcing a gas-liquid mixture through a packed column having as packing a material of very large surface area. In such packed column, the only source of energy to provide the turbulence required for foam formation will be the difference in the density between the gaseous and liquid phases of the foam-forming mixture. The smaller the pores in the packing through which the liquid-gas mixture is forced, the better will be the contact between gas and liquid, however, the throughput capacity gradually falls off with decreasing pore sizes until the flow of the mixture is stopped entirely.

Frequently, foam products such as shaving creams, shampoos, etc. are dispensed from devices of the "aerosol" type. Such devices usually consist of a closed container provided with a valve opening, from which air has been removed and into which the active substance has been introduced. A liquid propellant is then forced into the container under pressure. Upon opening of the container valve, the propellant gas together with a small quantity of the foaming liquid are forced out through the small valve orifice, the mixture upon leaving the container expands rapidly and thereby is converted into a foam. However, the charging of aerosol containers requires special pressurized equipment and special valves of close tolerances. Containers and valves must be able to withstand the overpressure within the aerosol container and must be chemically resistant against the various constituents of the charge. Consequently, difficulties are encountered when corroding liquids are to be dispensed. Furthermore, the containers, once emptied, are usually not suitable for re-charging and re-use.

It is, therefore, an object of the present invention to overcome the disadvantages of conventional foam producing and dispensing devices.

It is another object of the present invention to provide a device for producing and dispensing foam of controllable quality, i.e. a foam containing in a given volume evenly distributed the desired amount of liquid.

It is yet another object of the present invention to provide a foam producing and dispensing device which can be refilled and re-used.

It is a further object of the present invention to provide a foam producing and dispensing device of simple construction which can be produced easily and in an economical manner.

It is still another object of the present invention to provide a foam producing and dispensing device which can be filled and operated without requiring the use of a propellant, pressurized equipment, special valves and pressure resistant containers.

It is still a further object of the present invention to provide a foam producing and dispensing device by means of which the quality of the foam, i.e. its consistency, stability and liquid content, can be easily controlled.

It is an additional object of the present invention to provide a foam-producing and dispensing device having resilient wall portions which need not be impermeable to the vapors of the foam-forming liquid.

It is yet a further object of the present invention to provide a capless non-spilling foam dispenser.

Other objects and advantages of the present invention will become apparent from a further reading of the description and the appended claims.

With the above and other objects in view, the present invention mainly comprises a foam-producing and dispensing device comprising, in combination, a closed deformable container formed with opening means therethrough, and a compressible sponge-like element in the container, filling the same but partly and being spaced from the opening means thereof, whereby a foamable substance introduced, when in non-foamy state, into the container is absorbed and temporarily retained by the element and will, when the container is deformed in such a manner that the element is compressed, be changed to foamy state and may, in such foamy state, be expelled through the opening means of the container.

According to a preferred embodiment, the present invention also contemplates a foam producing and dispensing device, comprising, in combination, a closed flexible container formed with fluid inlet means and fluid outlet means therethrough, first valve means operatively associated with the fluid inlet means for preventing fluid egress therethrough, second valve means operatively associated with the fluid outlet means for preventing fluid ingress therethrough, a compressible sponge-like element capable of absorbing and temporarily retaining a foamable liquid and being arranged and partly filling the container and spaced from the fluid inlet means and the fluid outlet means thereof, whereby a foamable liquid introduced, when in non-foamy state, into the container through the fluid inlet means thereof is absorbed and temporarily retained by the element and will, when the container is deformed in such a manner that the element is compressed, be changed to foamy state and may, in such foamy state, be expelled through the fluid outlet means of the container, spacer means in the container and substantially filling that portion of the interior thereof which is unoccupied by the element, including the space between the element and the fluid inlet means and the fluid outlet means of the container, for positioning the element within the container, the spacer means being made of a material incapable of absorbing and temporarily retaining the foamable liquid but permitting the passage of the liquid through itself, and foamable liquid supply means in communication with the fluid inlet means for supplying foamable liquid to the element.

I have observed that upon saturating a compressible absorbing spongy fibrous or porous material with a foam-forming liquid and subsequent repeated compressing and releasing of the material, there will be first squeezed out from the partially compressed material in a liquid having a small amount of dispersed foam bubbles therein. When in this manner a sufficiently large portion of the liquid has been squeezed from the absorbing material so that upon release of pressure the pores of the absorbent material will be filled with a mixture of gas. f.i. air, and liquid, then, upon reaching of a certain gas liquid ratio in the material, upon further repeated compressing and releasing, the gas liquid mixture being squeezed from the absorbent material will emanate therefrom as a foam. In order to obtain a true foam in this manner it is necessary that the amount of liquid in the absorbent material is considerably less than the total amount of liquid the material is capable of absorbing. In other words, a liquid which has been absorbed by a sponge or other compressible resilient porous material to the limit of the absorbing capacity of the material, will upon squeezing emerge therefrom primarily in liquid form and at best only to a small degree in the form of a foam. However, when the sponge or the like has absorbed only a relatively small fraction of the quantity of liquid it is capable of absorbing, so that the sponge will also contain a considerable quantity of air, then, upon squeezing, the liquid will emerge from the sponge in the form of a foam. Thus, increasing the quantity of air or of another suitable gas in relation to the quantity of foam-forming liquid in the sponge, will produce foams of greater volume per unit of liquid content and will increase the capability of the foam to cover large surface areas with a small quantity of liquid. Smaller bubbles can be obtained by further breaking down the originally produced bubbles by whipping or agitating, or by passing the foam through a modifier, as will be described further below. In order to obtain foam containing a minimum of liquid, agitation must cease once the foam bubbles start to move outwardly in order to allow for proper drainage of the foam. Under drainage is understood thinning of the foam lamellae without rupture or bursting of the foam film. Drainage of foams from excess liquid can be accomplished according to the present invention, by providing a separation zone where the foam is not exposed to agitation or the like and where quiescence is assured. Thus, in order to obtain foam containing a minimum of liquid per unit of volume, agitation of the foam must cease once the foam bubbles start moving towards the opening through which the foam is to be dispensed, in order to allow for proper drainage of excess liquid from the foam.

According to the present invention, it is possible to produce and dispense even very small quantities of liquid in the form of a dry foam of great volume from a container such as a squeeze bottle or the like, which container can be maintained under normal atmospheric pressure and can be easily refilled without requiring the application of superatmospheric pressure. It is also within the scope of the present invention to so arrange the foam-producing and dispensing device that the same can be combined or connected with a conventional container, e.g. a glass bottle or measuring cylinder, so that a properly compounded liquid in measured quantities can be continuously dispensed in the form of a foam of desired consistency.

While the device of the present invention is primarily described and illustrated as a hand-operated relatively small device, the invention is not limited thereto but is to be understood to include large-sized embodiments for production of large quantities of foam, for instance for agricultural purposes, whereby the alternating compressing and releasing of pressure of the compressible resilient absorbing material may be carried out with suitable mechanical means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGS. 2–8 are elevational views in cross-section of various embodiments of foam-producing and dispensing devices according to the present invention;

FIG. 9 is an elevational view in cross-section of another embodiment of a portion of the device illustrated in FIG. 8;

FIG. 10 is an elevational view in cross-section of a portion of the foam-dispensing end of a device according to the present invention;

FIGS. 11–15 are elevational views in cross-section of other embodiments of foam-producing and dispensing devices according to the present invention;

FIG. 16 is an elevational view in cross-section of another embodiment of the lower portion of the device illustrated in FIG. 15;

FIG. 17 is an elevational view in cross-section of the air intake and outlet valve arrangement according to another preferred embodiment of the present invention;

FIG. 18 is an elevational view in cross-section showing a preferred embodiment of an inlet valve arrangement according to the present invention;

FIG. 19 is an elevational view in cross-section of another embodiment of an air intake valve according to the present invention;

FIG 20 is a fragmentary elevational view in cross-section of still another embodiment of the present invention;

FIG. 21 is an elevational view in cross-section of yet another embodiment of the present invention;

FIG. 22 is an elevational view in cross-section illustrating a step in assembling a device according to the present invention;

FIG. 23 is an elevational view in cross-section illustrating another step in assembling the device of the present invention;

FIG. 24 is an elevational view in cross-section of the completely assembled device partially illustrated in FIGS. 22 and 23;

FIG. 25 is an elevational view in cross-section illustrating the operation of the device shown in FIG. 24;

FIG. 26 is an elevational view in cross-section further illustrating the operation of the device of FIG. 24; and FIG. 27 is an elevational view in cross-section of yet a further embodiment of the foam-producing and dispensing device according to the present invention.

Figure 1:
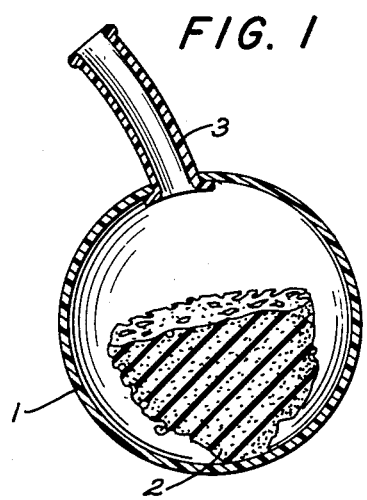
FIG. 1 is an elevational view in cross-section of a foam-producing and dispensing device according to the present invention.

As shown in the drawings, the foam-producing and dispensing device according to the present invention includes in combination two or more of the following features:

(1) A sponge or the like which is so arranged that during operation of the device it will have absorbed some liquid, however, will not be saturated with the liquid;

(2) A container such as, for instance, a flexible tube provided with inlet and outlet openings, the sponge being located within the container and spaced from the foam dispensing opening or orifice of the container;

(3) Means for feeding a liquid-gas mixture to the sponge in the container;

(4) Means for controlling the air intake taking place through one of the openings of the container, according to one embodiment through the foam-dispensing orifice;

(5) A device so arranged that the liquid therein will not spill even though the orifices or openings of the container are not provided with caps or other closures, and regardless of the position of the container;

(6) A device so arranged that the introduction of gas and liquid into the sponge is controlled by a foam-valve action; and (7) An embodiment according to which the sponge surrounds a substantially incompressible member so that the sponge will be of annular cross-section thus facilitating squeezing of the sponge due to the reduced thickness of the same.

The term "sponge" as used herein is meant to denote any suitable resilient, compressible, liquid-absorbing, porous material. Excellent results have been obtained with a sponge made of polyurethane, and particularly with a polyurethane foam having a specific gravity of 2.2 pounds per cubic foot formed with irregular pores, although any cellulose sponge, foam rubber sponge, Vinylite sponge, or any other sponge-like material may be used according to the present invention, provided that the material is capable of absorbing the foam-forming liquid and, upon being compressed will be capable of ejecting the liquid in the form of a foam. The sponge-like material may be formed with open cells exclusively or with open and closed cells. Since foam formation is controlled by the open pores or cells, the number of open pores in relation to the number of closed pores, as well as the size or diameter of the open pores in uncompressed condition can be so arranged as to obtain foam of the desired quality. Generally it has been found that sponge-like materials formed with open cells only, absorb too much fluid and consequently offer relatively high resistance against being compressed, so that exertion of greater pressure is required for forming and ejecting foam from the sponge. Without limiting the present invention to any specific proportion of open and closed pores, or excluding sponge-like material formed with open pores exclusively, it has generally been found particularly advantageous to use sponge-like materials having about 70-80% of open and 30-20% of closed pores. The size of the pores in the sponge-like material may vary considerably between different materials, as well as within one piece of sponge-like material. Generally, it is preferred to keep the size of the individual pores in relaxed and uncompressed condition between about 5 millimeters and 0.2 millimeter. It must be noted, that the present invention is not limited to any specific range of pore sizes. In this connection it should be understood that during operation of the present device, i.e. during alternating compressing and releasing of the sponge, the sizes of the individual pores, respectively, change constantly, thereby greatly contributing to the formation of foam of the desired qualities.

The sponge-like element according to the present invention may consist of one piece of sponge-like material, or of a plurality of smaller pieces. Thus, it is possible to use according to the present invention scraps of sponge-like material which may accrue in cutting the material for other purposes. It is thus also possible to use as the sponge-like element according to the present invention several pieces of sponge-like material of different origin thereby even further increasing the variations in pore sizes and in the rate of expansion and contraction of pores during operation of the device, and also better controlling the degree of resiliency of the sponge-like packing, for instance by using a combination of rubber foam and polyurethane foam pieces.

The term "shredded plastic" as used herein is meant to denote any material, preferably resilient and of random arrangement through which foam and liquid can pass and which can be inserted in the container between the sponge-like body and the dispensing outlet in such a manner as to prevent the sponge from extending too close towards the dispensing orifice, and which will permit the separation of excess liquid from the foam passing therethrough. Although it has been found particularly advantageous to use as such spacer means a shredded plastic consisting of a layer of loosely woven, curly, resilient plastic or rubber thread, any material may be used which is capable of preventing the sponge from entering into the area separating the same from the dispensing orifice and which material preferably will be incapable of absorbing the foam-forming liquid, so as to facilitate drainage of excess liquid from the foam. Furthermore, the shredded plastic will have to be such and will have to be so arranged as not to appreciably impede the flow of foam therethrough, even when compressed. All of these conditions are met by layers made for instance of glass fibers, shredded Vinylite or polyethylene bands, rubber rings or bands, ceramic fibers, metal sponges and the like. Very good results were obtained by employing as non-matting spacer means a material such as is described in U.S. Patent No. 2,601,771 and sold as cleaning aid.

The term "valve" when not more specifically defined is meant to denote any suitable means for controlling the flow of fluid through an orifice, such as ball valves, needle valves, flap valves, overlapping plastic lips, etc.

The term "foam-forming liquid" is meant to denote any liquid or semi-liquid substance, including solutions, emulsions and suspensions which is capable of being transformed to a foam, such as liquids or semi-liquids containing naturally occurring or synthetic capillary active substances, and generally foam-forming systems containing such substances, with or without foam-stabilizing agents and with or without finely dispersed or molecularly or colloidally dissolved solid materials.

The term "resilient plastic" is meant to denote any flexible and resilient material such as rubber, neoprene, polyethylene, tetrafluoromethylene, Vinylite, etc. which is capable of serving as flexible resilient portion of the container wall.

Referring now to the drawing, and particularly to FIG. 1, a hollow ball 1 made of flexible material, e.g. rubber, is shown having a sponge 2 attached to the inner wall thereof. A flexible tubing 3 connects the interior of hollow ball 1 with the outer atmosphere. Upon squeezing ball 1 so as to remove air from the interior thereof, the orifice of tube 3 is submerged into the foam-forming liquid and the pressure upon the ball is released to such an extent that liquid will enter the interior of the hollow ball and will be absorbed by sponge 2. Thereafter excess liquid is drained from the interior of the hollow ball by so positioning the same that hollow tube 3 extends in downward direction. Upon slight squeezing or pumping of ball 1, foam will be formed of the liquid absorbed by sponge 2 and of the surrounding air. Upon stronger squeezing of ball 1 the thus formed foam will emerge through the orifice of flexible tubing 3. The consistency of the foam can be easily controlled by prolonging the slight pumping or squeezing action before applying the somewhat greater pressure which is necessary to eject the foam from the interior of ball 1 through flexible tubing 3.

Figure 2:
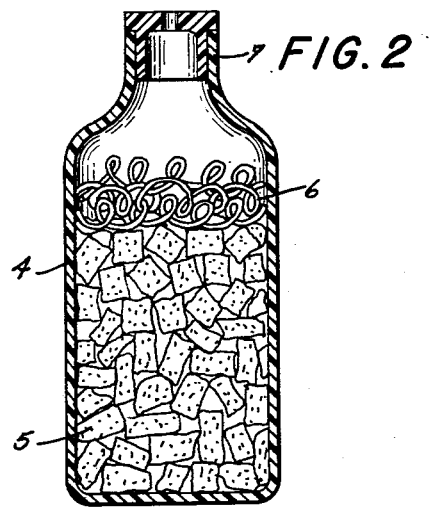

FIG. 2 shows a standard so-called "squeeze-bottle" 4, which may be made of polyethylene, cellulose acetate, or another suitable material, and which is partly filled with pieces of liquid absorbing material 5, such as pieces of cellulose sponge. The pieces of liquid-absorbing material 5 are introduced into bottle 4 through orifice 7. A layer 6 consisting of shredded plastic fiber material is superimposed upon cellulose sponge pieces 5 and serves to keep pieces of liquid absorbing material 5 in place during squeezing of the bottle. The bottle is then squeezed and orifice 7 is submerged in the foam-forming liquid. Upon release of squeezing pressure the resilient bottle will regain its original shape, thereby creating a partial vacuum inside the bottle and thus causing the foam-forming liquid to enter the bottle and, consequently, to be absorbed by liquid-absorbing material 5. After draining off any excess liquid, if necessary, subsequent squeezing of the bottle will cause foam formation within the same. The foam which will emanate from the pieces of liquid-absorbing material 5 will then pass through the layer of plastic fibers 6 towards orifice 7 and will emerge therefrom upon subjecting of bottle 4 to sufficiently strong squeezing pressure. It is essential for the efficient operation of a flexible column containing a compressible porous packing that the porous packing remains spaced from the ejection orifice, preferably by insertion of a spacer element 6 within the flexible container separating the porous sponge from the ejection orifice.

Figure 3:
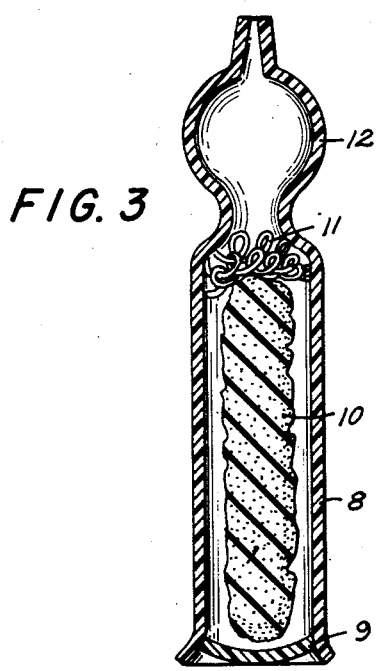

FIG. 3 shows an elevational cross-section through a plastic tube 8 made of Vinylite latex. Tube 8 is originally made with an open lower end 9. Sponge-like material 10 and shredded plastic layer 11 are introduced through open end 9 of tube 8, which open end is subsequently electronically sealed. An empty space 12 is maintained within the tube above plastic fiber layer 11 and serves for draining of the foam produced in tube 8 prior to dispensing of the foam. Upon squeezing of tube 8, insertion of the open end thereof into the foam-forming liquid and subsequent release of squeezing pressure, liquid will enter tube 8 and will be absorbed by sponge 10. Upon light squeezing or pumping action foam emanating from sponge 10, will pass through plastic fiber layer 11 into drainage space 12 and, upon exercising stronger pressure, particularly by subjecting the walls of chamber 12 to squeezing pressure, foam will be ejected through the orifice or permanently open end of tube 8.

Figure 4:
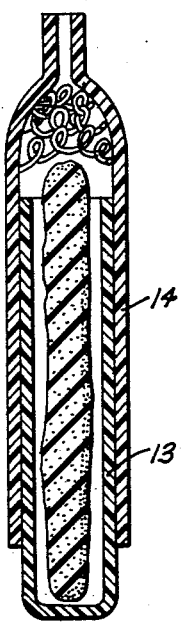

The embodiment of the present invention which is shown in FIG. 4 is somewhat similar to the embodiment illustrated in FIG. 3. The difference being that according to the embodiment illustrated in FIG. 4 the sponge is inserted into a permanently open resilient tube 13, which tube 13 with the sponge therein is then inserted into tube 14 through the lower end thereof. Thereafter squeezing action on tube 14 will hermetically join tubes 14 and 13 so that the device can be filled and foam can be produced therein in the manner described with reference to the embodiment illustrated in FIG. 3.

Figure 5:
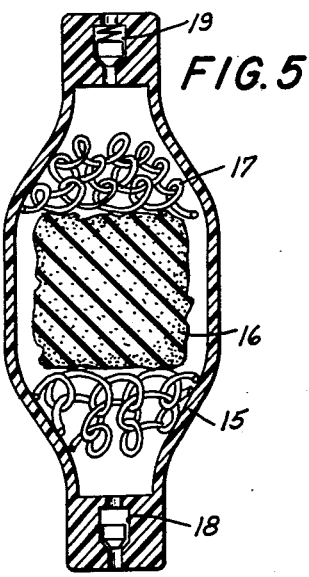

FIG. 5 illustrates a device for continuous ejecting of foam. Sponge 16 and plastic fiber separator 17 are located inside resilient container 15. The lower end of the container is closed by an inwardly opening valve 18, and the upper end of the container is closed by a similar valve 19 opening in outward direction. By squeezing the container and immersing lower end and valve 18 into the foam-producing liquid and subsequent release of pressure against the resilient container wall, liquid is introduced into the container and absorbed by sponge or the like 16.

Upon subsequent squeezing of the container foam is formed and is ejected through outwardly opening valve 19. When then the squeezing pressure upon the container walls is terminated the container will resume its original shape and thereby increase its inner volume so that air will enter through inwardly opening valve 18. Consequently, any foam already ejected through valve 19 but still clinging or adhering to the upper orifice of the container will not be sucked back into the container. Upon subsequent renewed squeezing of the container a foam will be again produced and ejected through valve 19, until substantially all of the liquid absorbed by the sponge has been ejected in the form of a foam.

The embodiment of the present invention shown in FIG. 6 is somewhat similar to the device illustrated in FIG. 5, except that valve 22, corresponding to valve 18 of FIG. 5, communicates with tubing 23 extending downwardly from valve 22, and that screw cap 21 is provided for connecting container 20 with a suitable conventional bottle in such a manner that tubing 23 will be inserted into the bottle and extend below the upper surface of a foam-forming liquid originally introduced into the bottle (not shown). Thus, upon squeezing of container 20, and subsequently allowing container 20 to resume its original shape, liquid such as foam-forming liquid will be sucked into container 20 through tube 23, and will be absorbed by the sponge, or the like, arranged in container 20.

Referring now to the embodiment of the present invention illustrated in FIG. 7, a foam-producing and dispensing device somewhat similar to those shown in FIGS. 5 and 6 is illustrated, including an outlet valve 30, a spacer means 28, consisting e.g. of shredded fibrous plastic material, and a sponge 27, or the like, capable of absorbing a foam-forming liquid. The dispenser 26 terminates in a downwardly extending tube having at its lower end a ball valve 29. The dispenser is arranged on a bottle 25 with the ball valve located inside the bottle and close to the bottom thereof. Thus, the illustrated device may be used for continuously dispensing foam.

The foam-forming and dispensing device illustrated in FIG. 8 comprises a flexible dispenser body consisting of two separate wall portions 31 and 37. The dispenser body is attached to a feed bottle 41. The lower wall portion 31 of the dispenser body, the bottle attachment 42, conical valve seat 33 and feed tubing 32 are made in one piece from plasticized Vinylite resin latex, preferably by dipping, after air tubing 35 has been embedded in the dipping mold. The open end 32a of feed tubing 32 has a smaller diameter than the inner diameter of the balance of tubing 32. Air inlet tubing 35 extends through most of feed tubing 32, however, does not reach the open end or orifice 32a, so that air entering through air inlet tubing 35 will tend to draw liquid into tubing 32.

Hollow cone 34 made of plastic material and showing perforations in its upper side portions and at its base, fits into valve seat 33 and is slightly pressed downwardly by the plastic lips 42a of attachment 42. Adjustment screw 36 located at the upper open end of air inlet tubing 35 allows control of air intake. Feed bottle 41 is shown to be filled with foam-forming liquid up to level 43. The wall portion 37 of the flexible dispenser body is made in one piece, including two overlapping plastic lips 38, which open outwardly when liquid is pressed out of the fully assembled foam-forming and dispensing unit, however, plastic lips 38 close and prevent the intake of air when pressure upon the dispenser is released. Prior to assembling dispenser wall portions 31 and 37, a sponge 39 or the like, and spacers 40 and 40a, consisting e.g. of shredded plastic material, are placed inside the dispenser in a manner similar to that illustrated in FIGS. 3, 4, 5, 6 and 7.

FIG. 9 shows a preferred embodiment of the lower portion of a liquid feed tubing 32b into which a smaller tubing 32c is sealed for the intake of liquid. The upper end of tubing 32c is located at a higher level than the exit of air intake tubing 35a which is sealed into tubing 32b. The open outer end of air intake tubing 35a is provided with an adjusting screw 36a. Liquid which will fill the lower end of tubing 32b, either as a result of previous operation of the device or due to priming of the same by closing valve 36a and slight pumping of the dispenser unit, serves as a temporary seal for the air intake when a new operation of the device is started. Upon compressing dispenser wall portions 31 and 37, valve 33 will close and air or foam will be ejected through the opening between lips 38. Upon releasing of pressure, lips 38 will close and valve 33 will be raised from its seat 34 while suction will force liquid through tubing 32a according to FIG. 8, or through tubing 32c, according to FIG.

9. Eventually air will be forced through air tubing 35 in FIG. 8, or 35a in FIG. 9 and will carry foam and liquid through tubing 33a into sponge 39. The ratio of air to liquid can be adjusted by screw valve 36 or 36a. It is of course important that the upper level of the liquid in squeeze bottle 41 is below the level of the air entrance 36 or 36a.

FIG. 10 is a cross-sectional view of another attachment 44, including a perforated dispensing member 45 which may be attached to lips 38 for dispensing a foam stream of larger diameter, for instance when shaving cream is to be dispensed.

FIG. 11 illustrates a foam-producing and dispensing device which is particularly suited for medical applications. It includes measuring device 47 as a storage container for the foam-forming liquid, and outlet tubing 51 attached to outlet lips 38. The liquid is introduced through tube 52 so as to fill the measuring device up to a desired point. Air too is taken in through tube 52 during operation of the device.

The embodiment shown in FIG. 12 includes a bellow-shaped rubber tubing 52 having one wide orifice 53 and a smaller orifice 54 opposite to wide orifice 53. Smaller orifice 54 is formed with walls forming a valve housing 55 opening into a small container 65 into which extends hermetically sealed tubing 56, reaching about to the middle of container 65, and an inner tubing 58 entering through a side wall or through the bottom of container 65 and having an open end located close to the bottom of container 65, while the other end of tubing 58 passes through a rubber cap 59 and communicates with the outer atmosphere. The outer opening of tube 58 is provided with an adjustable throttle 60. Rubber cap 61 provided with outlet valve 62 fits into orifice 53 of rubber tubing 52. Bellow-shaped rubber tubing 52 is partially filled with pieces of liquid-absorbing sponge 63, or the like, and with curled solid plastic material 64 serving as spacer element in a manner similar to that illustrated in FIGS. 2–10. Bottle cap 59 fits over the open end of bottle 65. The bellows-shape of tubular container 52 allows for easier pumping or squeezing and consequently for more efficient squeezing out of the sponge pieces 63. Foam formed in bellows-shaped rubber tubing 52 is ejected by pressing top 61 towards feed bottle 65. Liquid and air enter rubber tubing 52 through valve housing 55 when squeezing pressure upon bellows-shaped rubber tubing 52 is relieved.

FIG. 13 shows an embodiment of the present invention in which air intake tubing 66 forms part of valve 67 and is led through sponge 68 and through spacer 69 to communicate with the outer atmosphere outside of valve 70. The device, according to the present embodiment, is particularly easy to fit onto the feeding bottle. Flexible tubing 66 can be reinforced so as to form a resilient core around which sponge 68 is arranged. Excess foam will be sucked back into air tubing 66. Squeezing of the dispenser will temporarily restrict air intake through flexible tubing 66, thus allowing for better control of the device.

FIG. 14 illustrates a different embodiment of a top valve 71 and air intake 72 by-passing valve 71. Cap 73 can be placed over both air intake 72 and dispensing valve 71.

The embodiment illustrated in FIG. 15 shows a foam-forming and dispensing device with built-in feeder 74 and an air intake 75 at the foam-dispensing end of the device. Built-in feeder 74 is sealed with the bottom of the foam-forming and dispensing device, thus forming a dispensing unit which is particularly advantageous if the same is to be discarded after all of the foam-forming liquid originally contained in feeder 74 has been used up.

FIG. 16 illustrates another embodiment of the bottom portion of a device somewhat similar to the one shown in FIG. 15. However, according to FIG. 16, the feeder 76 is not integrally sealed with the bottom of the entire device, but is inserted into the lower end thereof and the seal between feeder and container wall is formed by choosing suitable dimensions and resiliencies of the container wall and of feeder 76, whereby preferably the container wall is made of a less rigid material than feeding bottle or feeder 76. If desired, a threaded connection can be provided between the feeder and the open bottom portion of the container.

Referring now to FIGS. 17 and 18, a combination of an air intake and outlet valve is shown, formed by orifice 77 of the dispensing container serving as valve housing, a valve cone 78 through which passes tubing 79 which is connected at 80 by a flexible tubing (not shown) to the upper end 83 of a tubing 88, shown in FIG. 18, where inlet valve 85 is mounted in a housing 84, similar to elements 77 and 78 of FIG. 17. Housing 84 forms part of proportionator casing 86 which is connected at 87 with a feed tubing (not shown). Valve housing 84 is formed with protruding plastic lips 82, adapted to press hollow cone 85 against casing 86. Cone 85 is formed with perforations in its side walls.

FIG. 19 illustrates a dispensing wall valve as in FIG. 17, however, closed at bottom portion 89 so that air intake is not possible through the dispensing valve. When using the dispensing valve according to FIG. 19, air intake will be arranged through a bottom valve as shown in FIG. 20, comprising a hollow balloon 90 ending in a protruding portion 91 is fitting loosely upon a seat 92. Upon compressing balloon 90, portion 91 is inflated thus more completely fitting into seat 92 and closing the valve. Small container 94 fitting into feed container 95 in which a measured quantity of liquid may be introduced, forms the liquid intake. Air intake takes place through slanted portion 93, the air passing through portion 93 into feed bottle 96 and liquid intake 95.

FIG. 21 illustrates a one-piece embodiment of the present invention, in which a portion 98 of the dispenser wall is rigid while portion 97 is resilient and can be squeezed or compressed so as to introduce air and liquid into the portion of the dispensing unit containing the sponge and to produce and dispense foam.

The basic idea of the present invention could also be described as a pumping device packed with a compressible packing. The liquid-air mixture is forced by the pumping action or squeezing action through the whole length of the packing, the packing being compressible and containing pores of continuously changing size due to the squeezing actions. The foaming liquid will then not simply pass through the pores of the sponge material as it would in a rigid or non-moving packed column but will bridge over the pores and will form films which will further increase in surface upon expansion of the pores during the changes in the degree of pressure applied to the device. These films will present an enormous surface area to the gaseous phase and will offer an ever increasing contact area between the gas and the liquid phase, as more and more films are broken up into smaller and smaller bubbles while the gas-liquid mixture is passing through the column. According to the present invention the sizes of the pores of the compressible packing when in relaxed condition can be considerably larger than the sizes of pores in a rigid incompressible packing, since according to the present invention most of the pores or void spaces will be alternatingly greatly reduced in size and restored to their original sizes during the repeated compression and releasing cycles. This fact is of great importance because it allows to meet the requirement for sufficient throughput capacity due to a very high total pore volume in the packing, and also the requirement for very small pores in order to achieve a more intimate contact between the gas and the liquid. Thus, the dispersing efficiency of a flexible column or container packed with a compressible packing or sponge in accordance with the present invention is very high and it is therefore possible to keep the dimensions of the present device relatively small in relation to output so as to be even suitable for adaptation within a small tube for dispensing e.g. medicines in minute quantities and relatively large volumes.

Thus, FIG. 15 shows a sealed collapsible resilient plastic tube from which a foam-forming liquid contained in storage unit 74 can be dispensed through orifice 75 in the form of a foam, and in which the air is not taken in by a separate tube leading into a bubble chamber below the liquid-intake valve but is sucked into the sponge packing through orifice 75 upon release of pressure, it has now been found that the above described form of air intake does not only offer great advantages in the construction of small dispensers, e.g. for shaving cream and the like, but also constitutes a novel way of packing foam-forming liquids within plastic tubes from which they can be dispensed in the form of a foam by squeezing the walls of the tube.

In this manner, a spillproof tube can be easily manufactured by confining the foam-forming liquid within a spillproof container located within the tube and by applying the principle of foam-valve action which will be described further below.

According to the present invention greatly improved dispersing efficiencies can be achieved by using compressible packings, i.e. compressible sponge-like elements as packing material for the packed container or column. This may be done alone or in combination with the introduction of surface active agents. Excellent dispersing and foam-forming efficiency is obtained according to the present invention when the pressure stroke of a reciprocating pump causes the compression of the compressible packing so as to utilize the pressure strokes of the pump for compressing the compressible sponge-like packing which will then expand during the reverse pump stroke, and will again be compressed by the next following pressure stroke of the pump.

Similarly high foam-forming efficiency can be obtained according to the present invention by arranging a sponge-like packing within the flexible tubular container adapted to act as a reciprocating pump device, as described in more detail below.

When a gas-liquid mixture is pumped by successive compressions of such a flexible container packed with a sponge-like compressible packing by alternatingly compressing and expanding the container walls, the packing is alternatingly compressed and expanded and the size of the very great number of pores in the packing changes continuously, each pore being at any given moment in a different state of its expansion and compression cycle. Thus, the area of interface contact between the gaseous and liquid components of the mixture partially filling the compressible container is enormously increased due to the finer sub-division of the dispersed phase and due to the fact that the rise of fine droplets within the packing is retarded so that the dispersed phase is kept for a relatively longer time within the packing.

When a liquid containing a surface agent, together with a gas is pumped through such a device, the liquid will not simply pass through the pores of the spongy material but will bridge over the pores and will form films which will further increase in surface upon expansion of the pores. By being broken up into smaller and smaller bubbles, the film will present an enormously increased total surface area to the gas, thus providing an increasingly larger contact area between the gaseous and liquid phases. Even such liquids which produce only a very light and easily collapsible foam by conventional methods such as being shaken vigorously, can be converted into a very stable foam comprising individual bubbles of small size, when being pumped through a flexible column such as here described, even though the column may be only a few inches high.

It has now been found according to the present invention that by packing a flexible column or any other type of container which allows the compression of the sponge-like packing, such as for instance a piston pump or a bellows-shaped container, with the sponge-like packing omitting a spacer between intake orifice and sponge, the pores of the part of the packing adjacent to the intake orifice upon being compressed become so small that eventually liquid can no longer pass therethrough, so that this tightly compressed portion of the packing will act as a stop valve when being pushed into the small opening of the ejection orifice of the container. The above-described characteristic of the flexible porous sponge packing, namely to be unevenly compressed, in accordance with its relative position in regard to the spacer, can be advantageously employed in such manner that a portion of the compressed porous packing will be adapted to carry out a valve-like function, controlling the passing of foam-forming liquid from a storage container to the sponge.

FIGS. 22–26 show a manner of assembling such foam-dispensing tube and its working mechanism. FIG. 22 illustrates an injection molded container member 101 made of semi-rigid plastic. FIG. 23 shows container 101 after the same has been filled with a foam-forming liquid and sealed with its open end pointing upwardly to bottom plate 102. Numeral 103 indicates the upper level of the liquid in the thus formed container. FIG. 24 illustrates a commercially available conventional polyethylene tube 104, into which injection molded piece 101 has been inserted and in which tube 104 and container 101 are joined by heat-sealing to bottom plate 102 after liquid has been filled into container 101. Prior to inserting liquid-filled container 101 and heat-sealing the same to polyethylene tube 104, sponge 109 and a spacer element 106 have been inserted into tube 104.

FIG. 25 shows the tube illustrated in FIG. 24 while the same is being compressed, while FIG. 26 shows the same tube in expanded state in upright position.

Upon compressing tube 104, sponge 109 which has been previously primed with liquid, is compressed and foam emanating therefrom fills the voids in spacer element 106, and also is forced through channel 108 into liquid filled container member 101, until the pores of the sponge portion adjacent to channel 108 are sufficiently compressed so as to bar further passage of foam or air-liquid mixture into channel 108. At that point ejection of foam through ejection orifice 107 takes place. Upon release of pressure and consequent expansion of the tube and sponge, liquid will pass from container 101 through channel 108 into sponge 109, while the foam blanket covering spacer 106 will temporarily resist the entry of air through ejection orifice 107. Eventually air from the outside orifice 107 will penetrate through the receding foam blanket and reach the partially liquid-filled sponge.

Thus, the dispenser tube which is hermetically attached to the non-spillable container, is for all practical purposes leakproof and capable of dispensing a liquid in form of foam of controlled characteristics.

The filled dispenser can be kept in any position even without a closing cap and will not leak either foam or liquid. The foam-ejecting orifice can be kept to very small dimensions, since the foam which is ejected under pressure will immediately upon leaving the orifice expand to a much larger volume.

Up to now, it has been one of the main obstacles in the use of polyethylene squeeze bottles and tubes for packaging cosmetic preparations, that the polyethylene sheet material forming the wall of the tube or bottle is permeable to vapors. Consequently, several processes for lining the inside of polyethylene tubes with a vapor-impermeable lining have been developed, however, the problem of bonding these liners permanently to the polyethylene sheet of the tube has not been solved satisfactorily up to now. It has been found that after several squeezings of the bottle the liner starts to peel off and the loose liner sheet will break and thus no longer protect the polyethylene tube against contact with vapors.

The present device overcomes these disadvantages of conventional polyethylene squeeze bottles, since the container for the foam-forming liquid which is inserted into the polyethylene squeeze tube can be made of any suitable material, which may be rigid, semi-rigid or flexible, since the container does not need to be bonded to the polyethylene tube. Conveniently, the container can be made of materials which are not permeable for vapors, such as certain types of saran-type plastics which are suitable for being formed by injection molding. The main quantity of the foam-forming liquid is kept in the container and does not come in contact with the wall of the polyethylene tube and, furthermore, the liquid contained in the storage container does not come in contact with air. Only the very small amount of liquid which is retained in the pores of the sponge comes in contact with the air. Thus, a small trace of conventional stabilizers and anti-oxydants, much less than usually required, will be sufficient to protect the flavor or odor of the liquid.

The squeeze tube, according to the present invention can be of varying sizes and can still be used with a container for the liquid being of a single predetermined size. It is thus possible to adapt size and shape' of the tube for easy and efficient manipulation in connection with a specific purpose, without necessitating change or reduction of the holding capacity of the storage container for the foam-forming liquid. It is also possible to provide the squeeze tube and the liquid container as a single integral structure and not as two separate members. In some cases it will be more convenient to mold, e.g. by blow-molding, the squeeze tube and the container for the liquid in one piece, and to insert a perforated separation plate after the unitary structure has been molded, or to make the storage container semi-flexible so that by slightly squeezing the liquid container, a sufficient quantity of liquid will be pushed into contact with and absorbed by the sponge.

As stated further above, the storage container 101 is hermetically sealed except for the small duct 108 shown in FIGS. 23–26. Duct 108 might extend close to the bottom of container 101 in such a manner as to retain the liquid without leakage even when the container is being held in such a position that the opening of duct 108 is pointing downwardly. Particularly, if the container is made of semi-rigid plastic or flexible material, liquid will be forced out of the container only under one of two conditions: First, upon slight pressure exercised upon the wall of the container when in upright position, or, second, when the inside pressure within container 101 rises above the level of the outside pressure.

The liquid container according to my invention, as described above, is hermetically-tight connected with the foam-producing and dispensing unit, whereby the sponge of the foam-producing unit will be located directly above the liquid dispensing duct 108. Upon compressing the walls of the sponge-packed tube or foam-producing device, the sponge within the tube will be pressed in part into the opening of duct 108. Thus, at first a small amount of foam will be forced into container 101, thus increasing the inside pressure in container 101. Eventually, when the sponge is further compressed, it will form a closing means, akin to a stop valve and will close the opening of duct 108. At the same time, and also after closing duct 108, foam retained in the sponge will be forced towards the open end of the dispenser tube, through the separation zone and the spacer element arranged therein, and will be ejected through orifice 107 into the outer atmosphere.

Upon relieving the pressure on the walls of the dispenser tube, the foam remaining on top of the sponge in the ejection orifice and spacer chamber of the tube, as well as the foam which has accumulated in the pores of the sponge, will offer sufficient resistance against air entering through the ejection orifice so that the expanding tube will allow first for expansion of the more compressed portion of the sponge, which served as stop valve against entrance of liquid into the sponge area from duct 108, so that this portion of the sponge will be lifted from the opening of duct 108. A small portion of the liquid which remained in container 101 under increased pressure during the compression cycle when foam and air were pressed into container 101, will now be forced out of container 101 through duct 108 into the sponge-filled portion of the foam-forming and dispensing tube until a pressure equilibrium has been re-established when the sponge blanket gives way to the entrance of air through the ejection orifice. Thereby, the sponge becomes again partly soaked with foam-forming liquid. The resistance against air intake through the ejection orifice 107 diminishes rapidly while foam is sucked back into the pores of the sponge. Air can now again enter freely through ejection orifice 107 into the interior of the tube into the pores of the partially liquid-soaked sponge and through duct 108 into container 101.

Thus, during alternating compression and expansion cycles in the operation of the dispensing tube, the foam-soaked sponge carries out the valve action required for proper operation of the device and allows for exact control of feeding liquid and air into the sponge. The degree of valve action of the foam can be preset and controlled by the specific construction of the dispenser, the viscosity of the foam-forming liquid and the characteristics of the foam formed of the foaming liquid, however, once established, the valve opening and closing action of the sponge remains practically unchanged, i.e., it is very little influenced by the manner in which the dispenser tube is manipulated. Quickly compressing the tube will close duct 108 faster without causing a higher pressure build-up in container 101. It is evident that the efficiency of the foam-valve action of the present device can be improved or controlled by the particular shape of the outer orifice of duct 108 which may be for instance in the shape of a cone or of a compressible sphere, or it may also be controlled by the insertion of a felt-like material between the sponge and the spacer material, so as to enhance the valve action, or by including one or the other of the valve functions-performing elements which are for instance illustrated in various figures of the present drawing.

The valve action of the above-described foam valve will be enhanced by inserting between the lower part of the sponge and the inlet orifice of duct 108 a domed sheet of synthetic or natural plastic material such as rubber, or by locating within the inlet orifice a small plastic or rubber bulb, preferably provided with a small hole facing duct 108. This bulb will be filled with air or foam, and, when being pressed down by the sponge, will eject an additional amount of air into container 101 before the orifice of duct 108 becomes sealed.

Since it is characteristic of the compressible packing that it operates in two alternating cycles, namely, by compression and expansion, it is desirable for continuous operation, i.e. for continuous production of foam, for instance for fire fighting purposes, to provide at least a two-column unit. For continuous operation, two or more columns may be connected to a manifold on the intake side, as well as to another manifold on the foam ejection side. It is also within the scope of the present invention to connect one or more of the columns of a multi-column arrangement to different feeders and/or collectors so that foams formed of a variety of liquids and gases can be produced and, if desired, mixed together, for instance, for reacting two liquids with each other in foam form so that the reaction takes place simultaneously over the largest possible surface area.

According to FIG. 27 it is also contemplated to insert a modifier between the foam-producing sponge and the ejection orifice of the device. A stationary diffuser or modifier 120 may be arranged on top of the sponge-like packing on either side of the spacer element, preferably between spacer 106 and sponge 109. The purpose of the modifier is to reduce the size of the foam bubbles and in many cases this arrangement will produce even better results with respect to producing of foam of desired quality, with less compression effort. The modifier thus serves 5 different functions in connection with the compressible sponge-like packing:

(1) The height of the sponge-like packing which has to be compressed can be reduced and therefore less power is necessary for compressing the packing. This is not only important in connection with large motor-driven devices according to the present invention, but also when the dispenser is combined with a non-spillable container as described further above, and the dispenser has to be operated by hand squeezing.

(2) The modifier serves as diffuser, i.e. for breaking up the foam bubbles into bubbles of still smaller size.

(3) The modifier does not only offer a controlled degree of resistance to the foam passing from the sponge to the ejection orifice, but also retards the flow of air from the ejection orifice during the expansion cycle of the foam-valve action which has been described further above.

As modifier according to the present invention may be used for instance any such diffusing materials as felt, diffuser plates, porous ceramics or metals, or one or more layers of filter cloth. In cases where a foam-producing and dispensing device made entirely of plastic material is required, it has been found that a suitable modifier can be made of a light-weight felt composed of fine nylon fibers and bonded with a thermosetting resin, such as is manufactured by the Gustin Bacon Man. Co. and sold under the trade name of Nylabond.

The modifier may also be located for instance as indicated by reference numeral 120a and may also extend in wick-like fashion into duct 108.

FIG. 27 also shows an incompressible fluid-impermeable member 110, surrounded by a sponge of annular cross-section 111. The sponge thus forms a compressible sleeve located about the substantially incompressible and impermeable elongated member 110, extending in axial direction in the closed deformable container of the present invention. In this manner a more easily compressible sponge-like member of relatively great volume can be obtained. The incompressible member 110 may for instance be made of hard rubber.

FIG. 27 shows bottom plate 102 of FIG. 24 replaced by removable cap 115, thus making the dispenser refillable.

The device described herein may also be advantageously used for intimately mixing liquids without foam formation.

It will be understood that each of the elements described above, or two or more together, may also find a useful application in other types of foam-producing and dispensing devices differing from the types described above.

While the invention has been illustrated and described as embodied in a foam-producing and dispensing device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A foam-producing and dispensing device comprising, in combination, a deformable container formed with opening means; a substantially incompressible member arranged in said container extending throughout at least a portion thereof; and a compressible sponge-like element in said container at least partially surrounding said member, filling said container but partly and being spaced from said opening means thereof, whereby a foamable substance introduced, when in non-foamy state, into said container is absorbed and temporarily retained by said element and will, when said container is deformed in such a manner that said element is compressed, be changed to foamy state and may, in such foamy state, be expelled through said opening means of said container.

2. A foam-producing and dispensing device, comprising, in combination, a housing forming a fluid chamber and a deformable foam-forming chamber communicating with each other, said latter chamber having a given volume when uncompressed and also having a foam-ejecting opening communicating with the surrounding atmosphere; a compressible sponge-like element in said deformable foam-forming chamber adapted to absorb foamable substance; and means maintaining said chambers in communication with each other when said foam-forming chamber is uncompressed and at least during a time when said foam-forming chamber is initially compressed, so that during compression of said closed deformable container, on the one hand, air contained therein will be forced into said fluid chamber placing the fluid contained therein under pressure and, on the other hand, foam created by passage of the foamable substance through said sponge-like element will be ejected through said foam-ejecting opening, while during release and consequent expansion of said deformable chamber, due to the reduced pressure contained therein, some foamable fluid will pass, due to over pressure in said fluid chamber, from the same into said deformable chamber so as to be absorbed by said sponge-like element therein.

3. A foam-producing and dispensing device, comprising, in combination, a housing forming a closed fluid chamber and a deformable foam-forming chamber communicating with each other, said latter chamber having a foam-ejecting opening communicating with the surrounding atmosphere; a compressible sponge-like element in said deformable foam-forming chamber adapted to absorb said foamable substance partly filling said deformable container and being spaced from said foam-ejecting opening and the portion of said foam-forming chamber adjacent to said fluid chamber; and spacer means in said deformable foam-forming chamber and substantially filling said portion of the interior thereof which is unoccupied by said sponge-like element, for positioning the same within said deformable foam-forming chamber in such a manner that said element is at all times spaced from said foam-ejecting opening and the portion of said foam-forming chamber adjacent to said fluid chamber.

4. A foam-producing and dispensing device, comprising, in combination, a housing forming a closed fluid chamber and a deformable foam-forming chamber communicating with each other, said latter chamber having a foam-ejecting opening communicating with the surrounding atmosphere; a compressible sponge-like element in said deformable foam-forming chamber adapted to absorb said foamable substance partly filling said deformable chamber and being spaced from said foam-ejecting opening and from the portion of said foam-forming chamber adjacent to said fluid chamber, so that during compression of said closed deformable chamber, on the one hand, air contained therein will be forced into said closed fluid chamber placing the fluid contained therein under pressure and, on the other hand, foam created by passage of the foamable substance through said sponge-like element will be ejected through said foam-ejecting opening, while during release and consequent expansion of said deformable chamber, due to the reduced pressure contained therein, some foamable fluid will pass, due to over pressure in said fluid chamber, from the same into said communicating deformable chamber so as to be absorbed by said sponge-like element therein; and spacer means in said deformable foam-forming chamber and substantially filling said portion of the interior thereof which is unoccupied by said sponge-like element, for positioning the same within said deformable foam-forming chamber in such a manner that said element is at all times spaced from said foam-ejecting opening and the portion of said foam-forming chamber adjacent to said fluid chamber, said spacer means being made of a material incapable of absorbing and retaining the foamable substance but permitting the passage of the substance through itself.

5. A foam-producing and dispensing device, comprising, in combination, a housing forming a rigid, fluid chamber and a resilient, deformable foam-forming chamber communicating with each other, said latter chamber having a foam-ejecting opening communicating with the surrounding atmosphere; a substantially incompressible member arranged in said deformable foam-forming chamber extending throughout at least a portion thereof in the direction from said fluid chamber towards said foam ejecting opening; a compressible sponge-like porous element including open and closed pores in said deformable foam-forming chamber at least partially surrounding said member and adapted to absorb foamable substance, partly filling said deformable foam-forming chamber and being spaced from said foam-ejecting opening and the portion of said foam-forming chamber adjacent to said fluid chamber, so that during compression of said deformable chamber, on the one hand, air contained therein will be forced into said fluid chamber placing the fluid contained therein under pressure and, on the other hand, foam created by passage of said foamable substance through said sponge-like element will be ejected through said foam-ejecting opening, while during release and consequent expansion of said deformable chamber, due to the reduced pressure contained therein, some foamable fluid will pass, due to over pressure in said fluid chamber, from the same into said communicating deformable chamber so as to be absorbed by said sponge-like element therein; and spacer means in said deformable foam-forming chamber and substantially filling said portion of the interior thereof which is unoccupied by said sponge-like element and said incompressible member, for positioning said sponge-like element within said deformable foam-forming chamber in such a manner that said element is at all times spaced from said foam-ejecting opening and the portion of said foam-forming chamber adjacent to said fluid chamber, said spacer means being made of a material incapable of absorbing and retaining the foamable substance but permitting the passage of the substance through itself.

6. A foam-producing and dispensing device, comprising, in combination a housing forming a fluid chamber and a deformable foam-forming chamber communicating with each other, said latter chamber having a foam-ejecting opening communicating with the surrounding atmosphere; first valve means arranged between said communicating chambers for preventing fluid egress from said deformable foam-forming chamber towards said fluid chamber; second valve means operatively associated with the foam-ejecting opening of said deformable foam-forming chamber for preventing fluid ingress therethrough into said deformable chamber; a compressible sponge-like element, capable of absorbing and temporarily retaining a foamable liquid, arranged in said deformable foam-forming chamber; and spacer means in said deformable foam-forming chamber and substantially filling said portion of the interior thereof which is unoccupied by said sponge-like element, for positioning the same within said deformable foam-forming chamber in such a manner that said element is at all times spaced from said foam-ejecting opening and said first valve means.

7. A foam-producing and dispensing device, comprising, in combination a housing forming a fluid chamber and a deformable foam-forming chamber communicating with each other, said latter chamber having a foam-ejecting opening communicating with the surrounding atmosphere; first valve means arranged between said communicating chambers for preventing fluid egress from said deformable foam-forming chamber towards said fluid chamber; second valve means operatively associated with the foam-ejecting opening of said deformable foam-forming chamber for preventing fluid ingress therethrough into said deformable chamber; a substantially incompressible member arranged in said deformable foam-forming chamber extending throughout at least a portion thereof in the direction from said fluid chamber towards said foam-ejecting opening; a compressible sponge-like element, capable of absorbing and temporarily retaining a foamable liquid, arranged in said deformable foam-forming chamber at least partially surrounding said member; and spacer means in said deformable foam-forming chamber and substantially filling said portion of the interior thereof which is unoccupied by said sponge-element and said incompressible member, for positioning the same within said deformable foam-forming chamber in such a manner that said element is at all times spaced from said foam-ejecting opening and said first valve means.

8. A device for producing and dispensing foam, comprising, in combination, container means having a lower chamber, adapted to contain a foamable liquid in non-foaming state, and an upper chamber located over said lower chamber, at least said upper chamber of said container means being compressible, so as to have its volume reduced, and expandable back to its original volume, and said container means having at said upper chamber thereof an outlet through which foam formed in said upper chamber is dispensed; compressible sponge means in said upper chamber; and tubular means extending in said lower chamber from the bottom of said upper chamber downwardly toward the bottom of said lower chamber and terminating in a bottom open end near the bottom of said lower chamber so that liquid in the latter chamber may flow through said tubular means into said upper chamber, whereby when said upper chamber is compressed foam therein will be dispensed through said outlet while when said upper chamber expands back to its original volume liquid will be displaced from said lower to said upper chamber to form additional foam therein.

9. A device for producing and dispensing foam, comprising, in combination, container means having a lower chamber, adapted to contain a foamable liquid in non-foaming state, and an upper chamber located over said lower chamber, at least said upper chamber of said container means being compressible, so as to have its volume reduced, and expandable back to its original volume, and said container means having at said upper chamber thereof an outlet through which foam formed in said upper chamber is dispensed; compressible sponge means in said upper chamber; and tubular means extending in said lower chamber from the bottom of said upper chamber downwardly toward the bottom of said lower chamber and terminating in a bottom open end near the bottom of said lower chamber so that liquid in the latter chamber may flow through said tubular means into said upper chamber, whereby when said upper chamber is compressed foam therein will be dispensed through said outlet while when said upper chamber expands back to its original volume liquid will be displaced from said lower to said upper chamber to form additional foam therein; valve means carried by said container means adjacent said outlet of said upper chamber for preventing foam from discharging through said outlet during expansion of said upper chamber; and valve means cooperating with said tubular means for preventing liquid from flowing upwardly therethrough into said upper chamber during compression of the latter.

10. A device for producing and dispensing foam, comprising, in combination, container means having a lower chamber, adapted to contain a foamable liquid in non-foaming state, and an upper chamber located over said lower chamber, at least said upper chamber of said container means being compressible, so as to have its volume reduced, and expandable back to its original volume, and said container means having at said upper chamber thereof an outlet through which foam formed in said upper chamber is dispensed; compressible sponge means in said upper chamber; tubular means extending in said lower chamber from the bottom of said upper chamber downwardly toward the bottom of said lower chamber and terminating in a bottom open end near the bottom of said lower chamber so that liquid in the latter chamber may flow through said tubular means into said upper chamber, whereby when said upper chamber is compressed foam therein will be dispensed through said outlet while when said upper chamber expands back to its original volume liquid will be displaced from said lower to said upper chamber to form additional foam therein; valve means carried by said container means adjacent said outlet of said upper chamber for preventing foam from discharging through said outlet during expansion of said upper chamber; valve means cooperating with said tubular means for preventing liquid from flowing upwardly therethrough into said upper chamber during compression of the latter; and additional tubular means communicating with the interior of said lower chamber and with the outer atmosphere to replace the volume of said lower chamber from which liquid is displaced with air.

11. A device for producing and dispensing foam, comprising, in combination, container means having a lower chamber, adapted to contain a foamable liquid in non-foaming state, and an upper chamber located over said lower chamber, at least said upper chamber of said container means being compressible, so as to have its volume reduced, and expandable back to its original volume, and said container means having at said upper chamber thereof an outlet through which foam formed in said upper chamber is dispensed; compressible sponge means in said upper chamber; and tubular means extending in said lower chamber from the bottom of said upper chamber downwardly toward the bottom of said lower chamber and terminating in a bottom open end near the bottom of said lower chamber so that liquid in the latter chamber may flow through said tubular means into said upper chamber, whereby when said upper chamber is compressed foam therein will be dispensed through said outlet while when said upper chamber expands back to its original volume liquid will be displaced from said lower to said upper chamber to form additional foam therein, said tubular means being entirely unobstructed throughout its length and maintaining said upper and lower chambers in communication with each other not only during expansion of said upper container but also during at least an initial part of the compression of said upper chamber.

12. A device for producing and dispensing foam, comprising, in combination, container means having a lower chamber, adapted to contain a foamable liquid in non-foaming state, and an upper chamber located over said lower chamber, at least said upper chamber of said container means being compressible, so as to have its volume reduced, and expandable back to its original volume, and said container means having at said upper chamber thereof an outlet through which foam formed in said upper chamber is dispensed, said outlet being entirely unobstructed and remaining at all times in communication with the interior of said upper chamber; compressible sponge means in said upper chamber; and tubular means extending in said lower chamber from the bottom of said upper chamber downwardly toward the bottom of said lower chamber and terminating in a bottom open end near the bottom of said lower chamber so that liquid in the latter chamber may flow through said tubular means into said upper chamber, whereby when said upper chamber is compressed foam therein will be dispensed through said outlet while when said upper chamber expands back to its original volume liquid will be displaced from said lower to said upper chamber to form additional foam therein, said tubular means being entirely unobstructed throughout its length and maintaining said upper and lower chambers in communication with each other not only during expansion of said upper container but also during at least an initial part of the compression of said upper chamber.

13. A device for producing and dispensing foam, comprising, in combination, container means having a lower chamber, adapted to contain a foamable liquid in non-foaming state, and an upper chamber located over said lower chamber, at least said upper chamber of said container means being compressible, so as to have its volume reduced, and expandable back to its original volume, and said container means having at said upper chamber thereof an outlet through which foam formed in said upper chamber is dispensed, said outlet being entirely unobstructed and remaining at all times in communication with the interior of said upper chamber; compressible sponge means in said upper chamber; and tubular means extending in said lower chamber from the bottom of said upper chamber downwardly toward the bottom of said lower chamber and terminating in a bottom open end near the bottom of said lower chamber so that liquid in the latter chamber may flow through said tubular means into said upper chamber, whereby when said upper chamber is compressed foam therein will be dispensed through said outlet while when said upper chamber expands back to its original volume liquid will be displaced from said lower to said upper chamber to form additional foam therein.

14. A device for producing and dispensing foam, comprising, in combination, container means having a lower chamber and an upper chamber located over said lower chamber, at least said upper chamber of said container means being compressible, so as to have its volume reduced, and expandable back to its original volume, and said container means having at said upper chamber thereof an outlet through which foam formed in said upper chamber is dispensed; a foamable liquid located in non-foaming state in said lower chamber; compressible sponge means in said upper chamber; and tubular means extending in said lower chamber from the bottom of said upper chamber downwardly toward the bottom of said lower chamber and terminating in a bottom open end near the bottom of said lower chamber so that said liquid in the lower chamber may flow through said tubular means from said lower chamber into said upper chamber, whereby when said upper chamber is compressed, foam formed therein will be dispensed through said outlet while when said upper chamber expands back to its original volume said liquid in said lower chamber will flow through said tubular means into said upper chamber to be received by said sponge means for forming additional foam in said upper chamber.

References Cited in the file of this patent

UNITED STATES PATENTS

| 1,655,678 | Dorment | Jan. 10, 1928 |
|---|---|---|
| 1,896,624 | Hollands | Feb. 7, 1933 |
| 1,938,385 | Hauch | Dec. 5, 1933 |
| 2,122,234 | McAuliffe | June 28, 1938 |
| 2,284,591 | Rose | May 26, 1942 |
| 2,311,367 | Chambers | Feb. 16, 1943 |
| 2,311,578 | Rose | Feb. 16, 1943 |
| 2,489,044 | Mumford | Nov. 22, 1949 |
| 2,531,525 | Oakes | Nov. 28, 1950 |
| 2,564,400 | Hall | Aug. 14, 1951 |
| 2,608,705 | Duff | Sept. 2, 1952 |
| 2,825,492 | Krasno | Mar. 4, 1958 |